Oct. 28, 1930.  A. H. BECK  1,779,798
PERSONAL WEAR BELT WITH ELASTIC CONNECTING MEANS
Filed Sept. 2, 1927
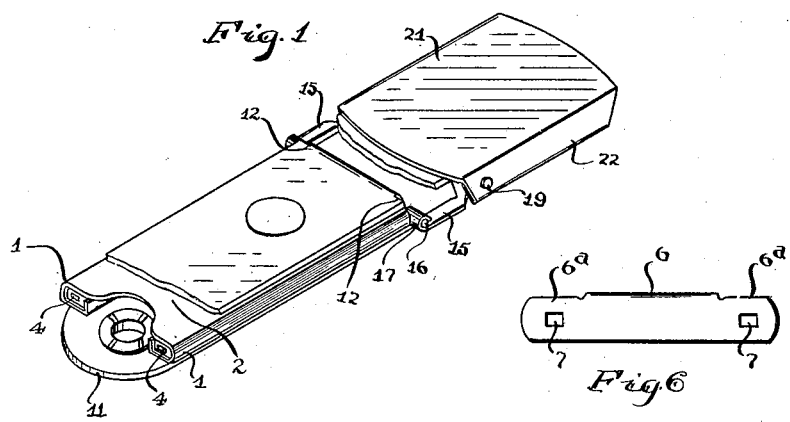
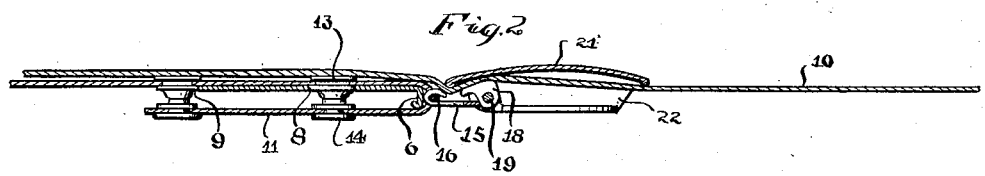
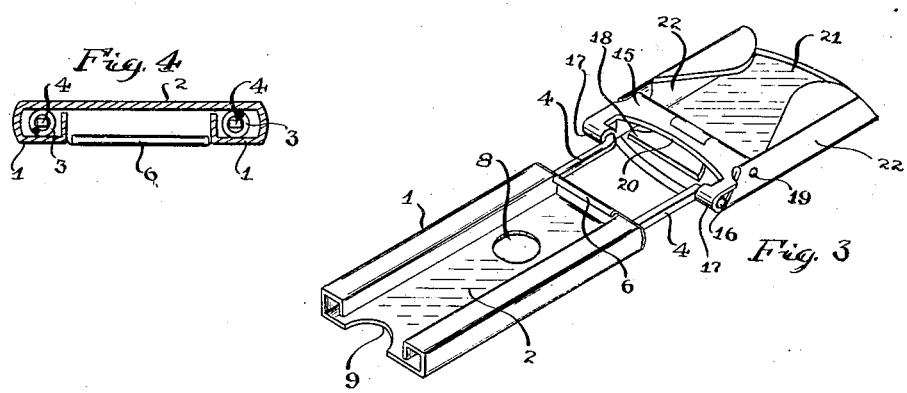
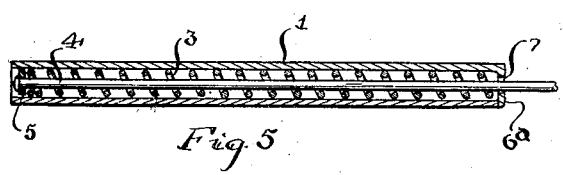
INVENTOR
Alvin H. Beck
BY
H. H. Simms
his ATTORNEY Patented Oct. 28, 1930

1,779,798

UNITED STATES PATENT OFFICE

ALWIN H. BECK, OF ROCHESTER, NEW YORK, ASSIGNOR TO HICKOK MFG. CO. INC., OF ROCHESTER, NEW YORK, A CORPORATION OF NEW YORK

PERSONAL-WEAR BELT WITH ELASTIC CONNECTING MEANS

Continuation of application Serial No. 627,179, filed March 23, 1923. This application filed September 2, 1927. Serial No. 217,281.

The present invention relates to personal wear belts with elastic connecting means, this application being a continuation of an application filed by me on March 23, 1923, Serial No. 627,179. An object of the invention is to provide a novel construction having means permitting the two ends of a belt to be secured to an elastic connecting means so as to render the elastic connecting means inconspicuous. A further object of the invention is to so mount the spring means that it does not contact with the belt while at the same time the belt lies in front of the same and hides such spring means.

To these and other ends, the invention consists of certain parts and combinations of parts all of which will be hereinafter described: the novel features being pointed out in the appended claims.

In the drawings:

Fig. 1 is a perspective view of an elastic connecting means constructed in accordance with this invention;

Fig. 2 is a longitudinal section through the connecting means and two ends of the belt;

Fig. 3 is a perspective view of the rear side of the connecting means;

Fig. 4 is a transverse section through the connecting means,

Fig. 5 is a longitudinal section through one of the spring casings; and

Fig. 6 is an end view of the plate member of the elastic connection.

In the illustrated embodiment of the invention, the belt end connecting means embodies two elongated spring casings 1 arranged in parallel relation and connected by a portion 2. In this instance, the spring casings 1 and the connecting portion 2 are formed from one piece of sheet metal, the central portion of which forms the web or connecting portion and the edge portions of which are rolled into the two tubes or spring casings 1.

Arranged in these spring casings and entirely enclosed thereby, are helical springs 3 and also two guide bars 4, one of the latter being positioned in each casing surrounded by one of the springs 3 and having an abutment 5 at one end engaging an end of its spring. The other ends of the two springs will engage the combined abutment and guide piece 6, which in this instance, is formed of one piece of metal with the tubes 1 and the connecting portion 2, being bent up from the central portion extending between the tubes or casings 1, wings 6ª on this flange closing the ends of the tubes and being provided with openings 7 through which the guide bars 4 operate and with the walls of which they have sliding engagement.

The form of the sheet metal member of the connecting means particularly lends itself to securing one end of a belt thereto so that this member of the connection will be inconspicuous. For this purpose, the central or web portion 2 of the sheet metal member is provided with two openings 8 and 9. The belt has its main portion 10 passed over the front face of the sheet metal member throughout the length of the spring casings and thence around the flanged end 6 so that an inwardly turned portion 11 lies on the rear face of the sheet metal member. That portion of the belt passing over the flange 6 of the sheet metal member is notched at 12 at opposite edges so as to be received between the two guide bars 4, thus permitting the main portion 10 and the inturned portion 11 of the belt to be coextensive in width with that of the sheet metal member, whereby, the latter may be effectively hidden by the belt. The springs by being entirely enclosed in casings do not rub on the belt and are thus given complete freedom of action. Separable snap fasteners of known construction each having two parts 13 and 14, may be arranged respectively on the main portion 10 and the inturned portion 11 of the belt to secure said portions together and also to the sheet metal portion, said fasteners passing through the openings 8 and 9 in the web or central portion 2. The spacing of the spring tubes or casings permits the holding means for one end of the belt to secure an end of a belt to the casing supporting member at a point between the tubes.

The other end of the belt 10 may be connected to the guide bars, in any suitable manner. It is preferred, however, to provide a belt anchoring means pivotally connected to the two guide bars to render the belt flexible at this point. In the illustrated embodiment, this belt anchoring means comprises a rigid connecting member 15 pivotally connected to the guide bars 4. This pivotal connection may be obtained by providing, on each guide bar, an outwardly extending bearing 16 for cooperating with axially alined bearings 17 formed adjacent opposite ends of the rigid connecting member 15. The guide bars are slightly flexible so that it is possible, when they are pulled out of the casings, to flex them slightly in a lateral direction and disconnect them from the connecting member by withdrawing the bearings 16 from the bearings 17. This rigid connecting member may also serve as a controlling member for the pivoted clamping member 18 which, in this instance, is mounted to turn on a pivot pin 19 and is carried by said connecting and controlling member 15 toward and from the rear face of a buckle frame to be described. The rigid connection is formed with a recess or opening 20 which is substantially as wide as the portion 11 of the belt so that said portion 11 may be readily passed therethrough to be positioned on the rear face of the sheet metal member of the elastic connecting means.

The buckle frame with which the clamping member 18 cooperates may be of any suitable form. In this instance, it comprises a front plate 21 having laterally turned side flanges 22 which support the pivot pin 19. The belt end 10 is adjustably secured by the clamping member 18 and extends over the pivotal connection between the guide bars 4 and the rigid connection 15.

It will be apparent that there has been provided a belt having the connecting means secured thereto in such a manner that the connecting means is inconspicuous. One end of the belt connects with one member of the connecting means in such a manner that the member is substantially hidden from view. This member forms the support for the resilient means and is so constructed that an inwardly turned end on the belt may be readily connected or disconnected from the main portion of the belt. The fastening means for the inwardly turned portion also acts to hold the belt to the elastic connection. The elastic connecting means also embodies two guide bars with a rigid member pivotally connected to them to hold them against separation and providing flexibility in the belt at this point. This rigid member may also serve as the controlling member for a clamp for holding the other end of the belt. In other words, the belt buckle and the clamp with the rigid member form an anchoring or securing means for one end of the belt pivotally connected to the two guide bars, this end of the belt being arranged to extend beyond the clamp to cover and bridge the space between the guide bars so that this portion of the connection is inconspicuous.

What I claim as my invention and desire to secure by Letters Patent is:

1. The combination with an elastic connection comprising two spaced tubes, a web connecting said tubes and provided with openings, springs arranged in said tubes, and guide bars operating in the tubes and cooperating with said springs, of a belt having a width equal to the width of the elastic connection with two portions lying on opposite sides of the web, said belt being passed around one end of the web and cut away to permit the passage of the guide bars, a separable fastener passing through an opening of the web and securing one end of the belt, and means for connecting the other end of the belt with the guide bars.

2. The combination with an elastic connection comprising two spaced guides, an enlarged loop connecting the guides at one end, an anchoring member having two spaced tubular portions in which said guides are movable, and helical springs in said tubular portions opposing the movement of the guides, of a belt having two portions lying on opposite sides of the anchoring member and a portion passing around one end of the anchoring member and cut away in opposite sides to permit the passage of the spaced guides, the width of the belt being greater than the distance between the guides and less than the width of the loop so that the belt may be passed through the loop to align its cutaway portions with the guides and means for connecting the other end of the belt with the loop.

3. The combination with a belt having an inwardly turned end portion, and a separable fastener connecting said end portion with the front or main portion, of a member having a portion engaging the bend between the main portion of the belt and the inturned end, said member lying between said portions and held thereto by the separable fastener, said member having a substantially flat face, substantially coextensive with the member and covered by the main portion of the belt, a spring entirely enclosed by said member so as not to engage the belt and lying in rear of the main portion of the belt, a member guided on said belt securing member and having its movement opposed by said spring, and means connected to said spring opposed member for securing the other end of the belt.

4. The combination with a belt having an inwardly turned end portion, and a separable fastener connecting said end portion with the front or main portion, of a member carrying two spring casings and having an opening between the spring casings, the main portion of the belt lying in front of the member and covering the two spring casings, the inwardly turned portion lying in rear of the main portion and the separable fastener passing through the opening in the member between the two spring casings, springs in the spring casings, two guide bars operating in the casings and having their movement opposed by the springs, and means connected with the two guide bars for connecting the other end of the belt thereto.

5. The combination with a member having two parallel guides, of spring means mounted on the member, two guide bars movable on the member and having their movements opposed by the spring means, a rigid member pivotally connected to said guides and having a recess disposed toward the space between the guide bars and of greater width than the space between the guide bars, means for connecting one end of a belt to the member having the parallel guides, and means for connecting the other end of a belt to the rigid member.

6. The combination with a member having two parallel guides, of springs mounted on and enclosed by the member, two guide bars movable on the member and having their movements opposed by the springs, a transversely extending bearing at the outer end of each guide bar and a rigid member having two aligned spaced bearings adjacent opposite sides thereof turning on the bearings of the guide bars, means for connecting one end of a belt to the member having the parallel guides, and means for connecting the other end of a belt to the rigid member.

7. The combination with a member having two parallel guides, of springs mounted on and enclosed by the member, two guide bars movable on the member and having their movement opposed by the springs, a bearing projecting laterally from the outer end of each guide bar, and a rigid member having spaced aligned bearings adjacent opposite sides turning on the laterally projecting bearings of the two guide bars, means for connecting one end of a belt to the member having the parallel guides, and means for connecting the other end of a belt to the rigid member.

8. The combination with a member having two parallel guides, of springs mounted on the member, two guide bars mounted on the member and having their movement opposed by the springs, said guide bars being laterally flexible, laterally projecting bearings on the guide bars, a rigid connecting member, and sleeve bearings adjacent opposite sides of the rigid connecting member receiving the laterally projecting bearings and having the latter disconnectible therefrom by flexing the guide bars laterally, means for connecting one end of a belt to the first named member, and means for connecting the other end of the belt to the rigid connecting member.

9. The combination with a belt for personal wear, of a member having two spring enclosing casings spaced apart, means arranged between the spring casing for holding such belt to the member in front of the spring casings throughout the length of the latter, springs entirely enclosed in the casings, two guide bars having their movement opposed by the springs, and means for holding the other end of the belt to the guide bars, said means having pivotal connection with the guide bars, one end of the belt extending across said pivotal connection and over the other end of the belt.

10. The combination with a belt, of a tube carrying member having two spring holding tubes arranged entirely in rear of the main portion of the belt and hidden thereby, springs enclosed in said tubes, means engaging the belt between the tubes for securing one end of the belt to the tube carrying member, two guides sliding in the tubes and having their movement opposed by the springs, and means connected to said guides to secure the other end of the belt.

11. The combination with a belt having an inturned end, and a separable fastener securing said end to the front portion of the belt, of a member having a portion engaging the bend between the inturned end of the main portion and also having two tubes along opposite sides held between said inturned end and the front portion, said member having a web connecting the two tubes and provided with an opening through which the separable fastener is passed, two guide bars movable in the tubes, springs enclosed in the tubes so as to be held out of contact with the belt and opposing the movement of the guide bars, and means connected to the guide bars for holding the other end of the belt.

ALWIN H. BECK.